J. T. UEBBING & H. MARSHALL.
COMPUTING MACHINE.
APPLICATION FILED FEB. 5, 1907.
914,467.
Patented Mar. 9, 1909.
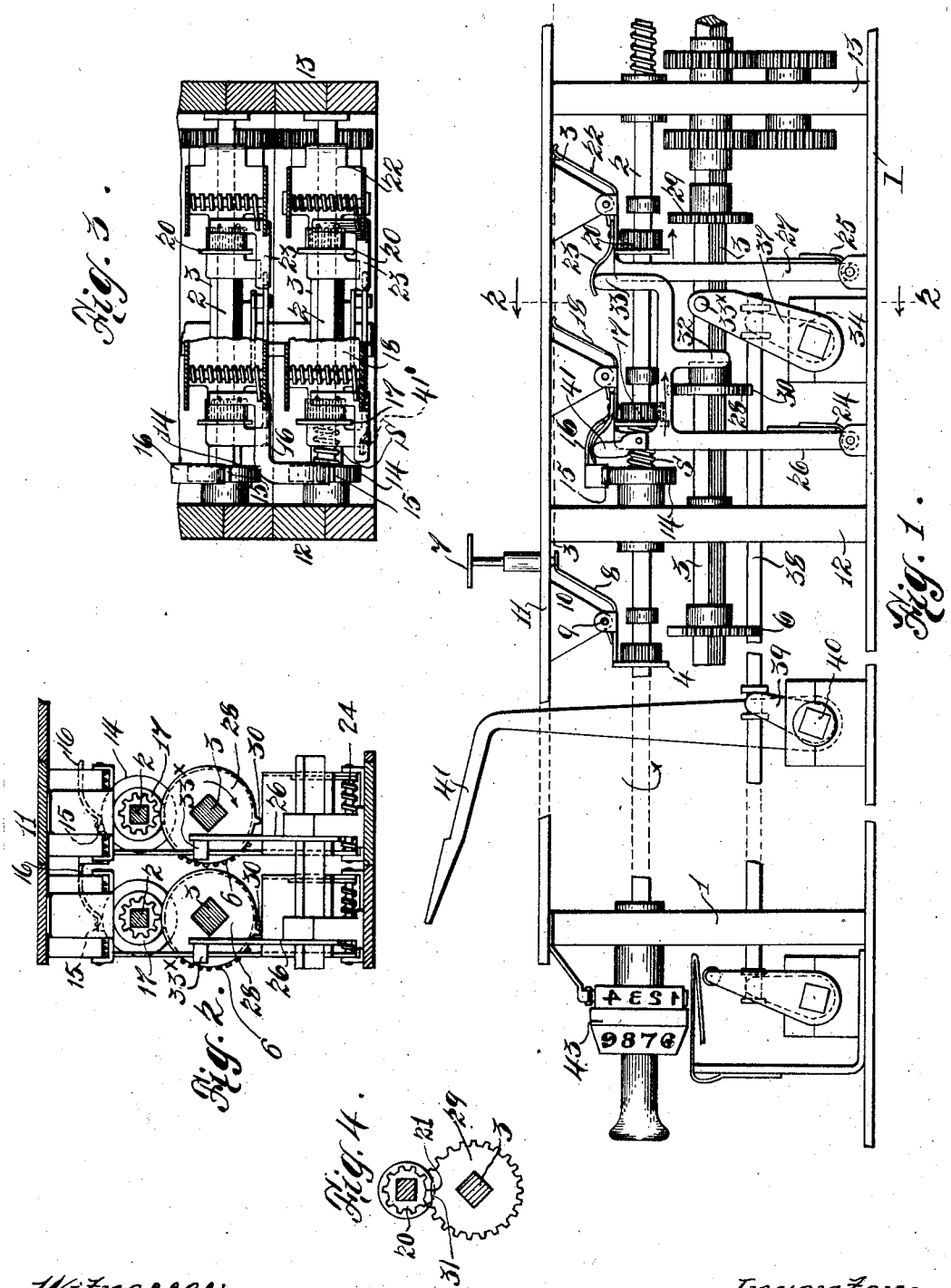
Witnesses:
C. A. Jarvis
F. W. Wright
Inventors
Johnro Marshall & Joseph T. Uebbing
By Emmmm Atwell
Attorney

UNITED STATES PATENT OFFICE.

JOSEPH T. UEBBING, OF CLEVELAND, OHIO, AND HOLMES MARSHALL, OF NEW YORK, N. Y., ASSIGNORS TO ADDOGRAPH MANUFACTURING COMPANY, A CORPORATION OF NEW YORK.

COMPUTING-MACHINE.

No. 914,467.    Specification of Letters Patent.    Patented March 9, 1909.

Application filed February 5, 1907. Serial No. 355,868.

*To all whom it may concern:*

Be it known that we, JOSEPH T. UEBBING and HOLMES MARSHALL, citizens of the United States, residing at Cleveland, Ohio, and New York city, New York, respectively, have invented certain new and useful Improvements in Computing-Machines, of which the following is a clear, full, and exact description.

The object of this invention is to provide an improved means for setting to zero the wheels of adding or computing machines, such for instance as shown in U. S. Patent No. 800,810 granted to Marshall & Uebbing.

Our invention will be pointed out in the claims.

In the drawings, Figure 1 is a partial side elevation of the units member of a computing machine of our prior patent heretofore referred to, provided with the devices of this invention; Fig. 2 is a section on the line 2—2 Fig. 1 showing the units and tens members of our machine looking in the direction of the arrows; Fig. 3 is a plan view on line 3—3 Fig. 1 shown as taken between the uprights, hereinafter referred to; and Fig. 4 is a detail of the re-setting wheels.

As shown in the drawings, each structural member or unit of the machine may be composed of a frame 1 in which an indicator shaft 2 and an operating shaft 3 is located. On the indicator shaft there are located wheels 4, one of which only is shown in the drawings, but it will be understood that a number of these are usually supplied in machines of this character, and on the shaft 3 there are located a number of wheels having different numbers of teeth, the wheel 6 shown having nine teeth. These wheels constitute connecting mechanisms normally incapable of causing the operation of the indicator from the operating shaft. A key 7, one of a series, is provided to control a detent 8 pivoted at 9 in brackets 10, in the top plate 11 of the machine and it constitutes a selective mechanism for permitting the engagement of the gear 4 of the indicator with the wheel 6 of the operating shaft 3, all as shown in our before-mentioned United States patent.

Upon the indicator shaft 2 there is carried between uprights 12 and 13, three disks, disk 14 constituting a controlling means for permitting a carrying to the next higher denomination, and provided with one tooth 15 to operate a controlling lever 16 of the next denomination. Disk 17, which is a gear wheel, preferably of ten teeth, is slidable on the shaft but normally held from sidewise motion by a detent spring 18, operated by such a controlling lever 16, and said lever being operated from a single tooth disk 14 mounted on an adjacent shaft of the next lower denomination. Disk 20 having a cut-away portion 21, as shown in Fig. 4, and known as the indicator re-setting disk being in fact a mutilated gear is also mounted on the said indicator shaft. The toothed indicator re-setting disk 20 is slidable on its shaft and is normally held from sliding by a detent spring 22 provided with an arm 23. Springs 24 and 25 on two levers 26 and 27 shown in Fig. 2 serve to tend to shift such disks 17 and 20 always sidewise upon their shaft. Independently of the pressure caused by spring 24, disk 17 is provided with a coil spring S which tends to throw said disk to the right, Fig. 1. This spring S therefore acts on disk 17 when lever 26 is thrown to the left to release the detent 18, as will be more particularly described hereafter.

On the operating shaft 3 there are mounted two disks 28 and 29 fixed in position, one a disk 28 having one tooth 30 known as a carrying forward disk, and the other 29, a mutilated gear wheel having a cut-away portion 31, and known as a re-setting disk. The re-setting disk 29 on the shafts of all denominations may be the same in position, but the carrying forward disk 28 on the different shafts should have their single teeth 30 in advance position as shown in Fig. 2. It is observed from this figure that the left-hand disk 28 on the shaft of a lower denomination has its single tooth nearer to the position in which it operates the wheel 17 than does the adjacent disk of a higher denomination. Thus the disks on the shafts of the several denominations will come consecutively into play beginning with the lowest. The arrow shows the direction of rotation in order that the carrying shall be done successively from right to left as one faces the machine, so that if figures 9, 9, 9, were indicated and one added, the 1 would first be transferred to the tens column by the tooth 30 of the units column, and then, and not until then, would the transfer from the tens column to the hundreds column occur.

Our re-setting wheels 20 and 29 as shown in Fig. 4 are so positioned with relation to the indicator shaft, that upon a complete operation of the machine they will rotate their various shafts forward to indicate in each column the figure 9. In other words, if the figures 237 occurred as a result of the last operation, the units wheel would be set forward two spaces, the tens six spaces and the hundreds seven spaces, until nine occurred in each space without any possibility of carrying any figure. It is then that our improved mechanism of this invention comes into play. The spring S when the re-setting lever 41 has been operated forces the gear wheel 17 into the path of the single tooth 30 on the units disk 28, and this tooth of the units disk is so positioned that it will come into play just as, or just after, the resetting mechanism has taken the position of Fig. 4, thus adding to the units column by a tenth of a revolution and causing that column to rotate to zero position, releasing by the tooth 15 of the disk 14 the carrying mechanism of the next higher column in which the tooth 30 of its disk 28 will rotate that column one tooth and a normal carrying of one will be effected across the entire machine, thus re-setting it to zero.

The resetting disk 20 of the units column is released from the spring detents 22 by the oscillation of the re-setting lever 26 carrying the lug 33 engaging the detent 23 and a lug 32 to be struck and operated by a pin 33$^x$ on an arm 37, said arm being rocked by an arm 34 controlled in turn by a longitudinally moving shaft 38 operated by a lever 41 on shaft 40 and rock arm 39. The carrying disk 17 is released from its detent 18 in the same way by the lug 41' on the arm 26 raising the free end of the detent. The re-setting disk 20 of the tens, hundreds, etc. units are all released in the same manner as in the same disk of the units column, but the disks 17 of tens, hundreds, etc. are released in the same manner as shown in our prior patent by the tooth 15 and lever arm 16 of the next lower column.

What we claim is:

1. In a computing machine in combination, a plurality of indicators for different denominations, an operating device for operating each indicator independently of any other indicator different amounts, a separate carrying device also provided for actuating each indicator including the units indicator a single step.

2. In a computing machine in combination, a plurality of indicators for different denominations showing zero to 9, an operating device for operating each indicator independently of any other indicator different amounts, a separate carrying device also provided for actuating each indicator including the units indicator a single step, means for resetting said indicators to 9, said resetting means automatically operating the carrying device for each indicator.

3. In a computing machine in combination, a plurality of indicator shafts for different denominations, an operating shaft for each indicator shaft, means carried by each operating shaft to operate its corresponding indicator shaft different amounts, a separate carrying wheel also carried by each operating shaft including the units operating shaft for operating the corresponding indicator shaft a single step, and means for causing said carrying wheels to operate their corresponding indicator shafts at proper times.

4. In a computing machine in combination, a plurality of indicator shafts for different denominations, an operating shaft for each indicator shaft, means carried by each operating shaft to operate its corresponding indicator shaft different amounts, a separate carrying wheel also carried by each operating shaft including the units operating shaft for operating the corresponding indicator shaft a single step, gear wheels mounted on each indicator shaft normally out of engagement with said carrying wheels, and means for causing the engagement of said gear wheels with the corresponding carrying wheels at proper times to be operated thereby.

5. In a computing machine in combination, a plurality of indicator shafts for different denominations, an operating shaft for each indicator shaft, means carried by each operating shaft to operate its corresponding indicator shaft different amounts, a separate carrying wheel also carried by each operating shaft including the units operating shaft for operating the corresponding indicator shaft a single step, gear wheels mounted on each indicator shaft normally out of engagement with said carrying wheels, and mechanism automatically operated by each indicator shaft to cause the gear wheel of the adjacent indicator shaft of higher denomination to engage with its corresponding carrying wheel, and a hand-operated device to engage the gear wheel of the units indicator shaft with its corresponding carrying wheel.

6. In a computing machine in combination, a plurality of indicator shafts for different denominations, an operating shaft for each indicator shaft, means carried by each operating shaft to operate its corresponding indicator shaft different amounts, a separate carrying wheel also carried by each operating shaft including the units operating shaft for operating the corresponding indicator shaft a single step, gear wheels mounted on each indicator shaft normally out of engagement with said carrying wheels, and mechanism automatically operated by each indicator shaft to cause the gear wheel of an adjacent shaft of higher denomination to engage with its corresponding carrying wheel, a resetting mechanism comprising coöperating mutilated gears mounted on the corresponding indicator and operating shafts, said coöperating mutilated gears being normally disengaged, and a hand-operated device for causing the engagement of said mutilated gears and also to cause the gear wheel of the units shaft to engage with its corresponding carrying wheel.

Signed at Cleveland, O. this 31st day of January 1907.

JOSEPH T. UEBBING.
HOLMES MARSHALL.

Witnesses to Joseph T. Uebbing:
WALTER J. HAMILTON,
H. D. SMITH.

Witnesses to Holmes Marshall:
F. W. WRIGHT,
BEATRICE MORRIS.